(12) United States Patent
Zhu (10) Patent No.: US 10,389,022 B2
(45) Date of Patent: Aug. 20, 2019

(54) SATELLITE FINDING APPARATUS AND SATELLITE FINDING METHOD (71) Applicant: NANNING FUGUI PRECISION INDUSTRIAL CO., LTD., Nanning (CN)

(72) Inventor: Gui-Dong Zhu, Shenzhen (CN)

(73) Assignee: NANNING FUGUI PRECISION INDUSTRIAL CO., LTD., Nanning (CN)

(*) Notice: Subject to any disclaimer, the term of this patent is extended or adjusted under 35 U.S.C. 154(b) by 0 days.

(21) Appl. No.: 15/263,329

(22) Filed: Sep. 12, 2016

(65) Prior Publication Data
US 2017/0373390 A1 Dec. 28, 2017

(30) Foreign Application Priority Data

Jun. 28, 2016 (CN) .......................... 2016 1 0487150

(51) Int. Cl.
*H01Q 3/00* (2006.01)
*H01Q 1/12* (2006.01)
*H01Q 3/04* (2006.01)
*H04N 21/422* (2011.01)
*H04N 21/438* (2011.01)
(Continued)

(52) U.S. Cl.
CPC ................. *H01Q 3/04* (2013.01); *H04N 7/20* (2013.01); *H04N 21/42212* (2013.01); *H04N 21/4383* (2013.01); *H04N 21/6143* (2013.01); *H04N 21/6193* (2013.01)

(58) Field of Classification Search
CPC ............ H01Q 3/005; H01Q 3/02; H01Q 3/04; H01Q 3/08; H01Q 1/125; H01Q 1/1257
See application file for complete search history.

(56) References Cited

U.S. PATENT DOCUMENTS 4,446,407 A * 5/1984 Sperber .................... H01Q 3/02
318/282
6,334,218 B1 * 12/2001 Jeong ..................... H01Q 1/125
342/359
(Continued)

FOREIGN PATENT DOCUMENTS

| CN | 102057565 A | 5/2011 |
| CN | 102064517 B | 8/2013 |
| CN | 102723602 A | 7/2014 |

(Continued)

*Primary Examiner* — Hai V Tran
*Assistant Examiner* — Patrick R Holecek
(74) *Attorney, Agent, or Firm* — ScienBiziP, P.C.

(57) ABSTRACT

The disclosure provides a satellite finding apparatus and satellite finding method, includes a set-top-box (STB) and a satellite antenna receiving device (SARD). The STB receives signals from the satellite antenna receiving device, and the STB comprises a central processing unit, a power transforming unit, a satellite switching judging module, a driving controlling module and a current detecting module. The SARD includes motors, tuners and antennas. The disclosure further provides a satellite finding method. The satellite finding apparatus will perform short-circuit detection if a switch of satellite is determined upon. The disclosure enables the motor only at the time when the satellite finding apparatus needs to find the satellite, it can save energy and prevents the destroying of the motor.

4 Claims, 6 Drawing Sheets (51) Int. Cl.
*H04N 21/61* (2011.01)
*H04N 7/20* (2006.01)

(56) References Cited

U.S. PATENT DOCUMENTS 9,521,378 B1 * 12/2016 Palaganas ................ H04N 7/20
2011/0109254 A1   5/2011 Krause

FOREIGN PATENT DOCUMENTS

EP       0417472 A2 *  3/1991  .............. H01Q 3/02
TW       201009375      3/2010

* cited by examiner

SATELLITE FINDING APPARATUS AND SATELLITE FINDING METHOD

FIELD

The present disclosure generally relates to satellite finding technology of digital televisions, and more particularly to a satellite finding apparatus and satellite finding method.

BACKGROUND

In digital satellite receiving system, a control signal from a signal line between a set-top-box (STB) and a satellite receiver is transmitted to a Low Noise Block (LNB), a polar axis seat, and other devices to switch satellites. Satellite antenna and LNB device are active devices and they work outside, so they are easily effected by the environment. The STB transmits the control signal to a motor to rotate the polar axis seat for receiving satellite signals. The motor only works at the time while repositioning to focus on a satellite, so most of the time the motor is idle.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to". it specifically indicates open-ended inclusion or membership in the so-described combination, group, series and the like.

Figure 1:
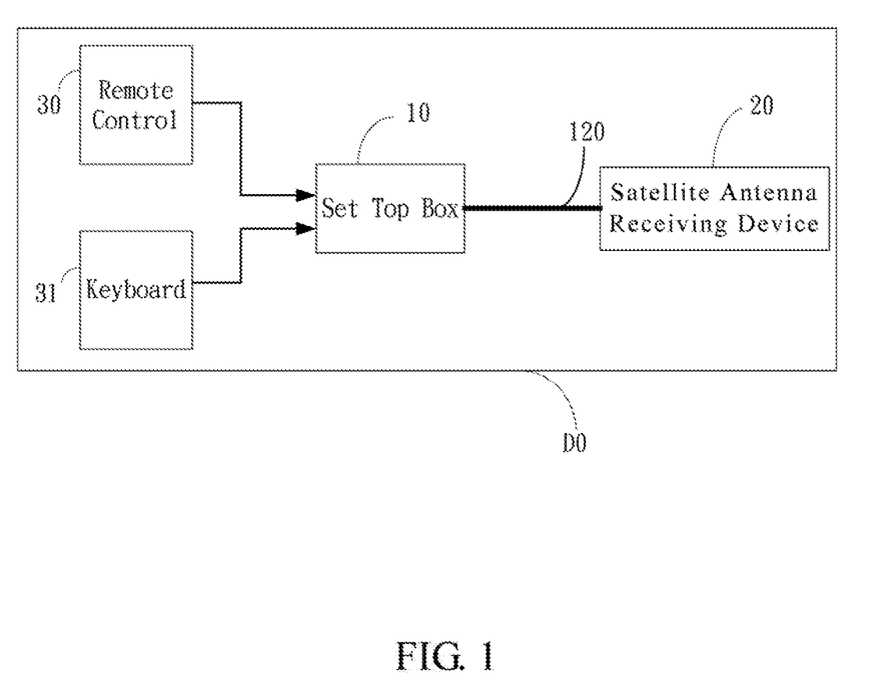
FIG. 1 is a configuration schematic diagram of a satellite finding apparatus according to one embodiment of the disclosure.

FIG. 1 shows a configuration schematic diagram of a satellite finding apparatus DO according to one embodiment of the disclosure.

In one embodiment, satellite finding apparatus DO comprises a set top box (STB) 10 and a satellite antenna receiving device 20. The STB 10 is electrically connected to satellite antenna receiving device 20 via signal line 120. STB 10 receives an antenna signal from satellite antenna receiving device 20, and signal line 120 can be a coaxial cable. As shown in FIG. 1, remote control 30 and keyboard 31 are coupled to STB 10, and are configured to input channel switch commands and any other control inputs. The connection types of STB, remote control 30, and keyboard 31 can be wired or wirelessly connected. In other embodiment, keyboard 31 can be included in STB 10.

Figure 2:
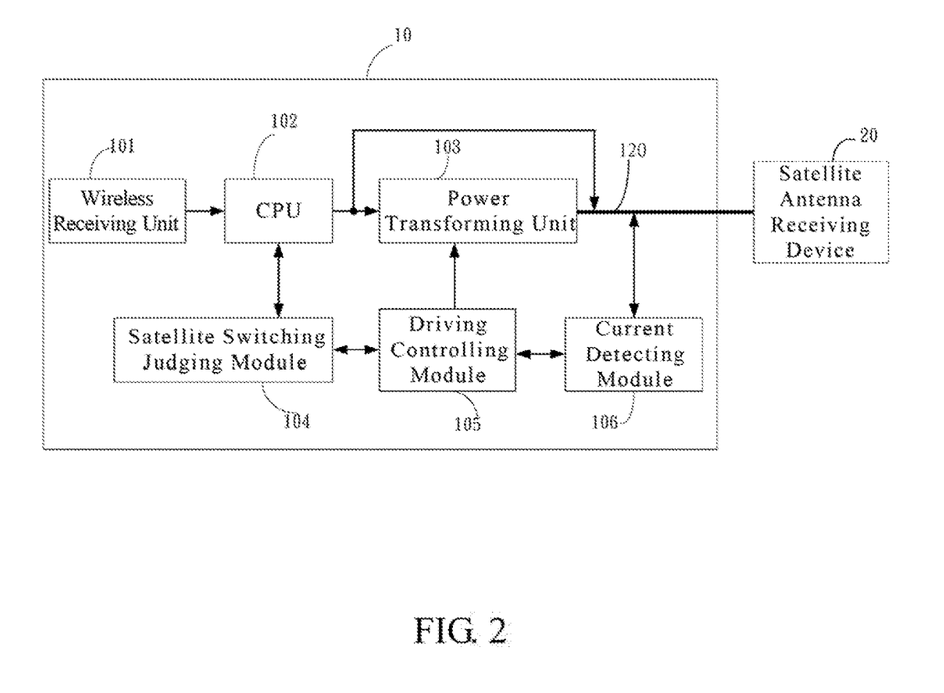
FIG. 2 is a configuration schematic diagram of a STB according to an embodiment of the disclosure.

FIG. 2 is a configuration schematic diagram of STB 10 according to an embodiment of the disclosure.

In one embodiment, STB 10 comprises central processing unit (CPU) 102. CPU 102 is configured to compute and output control signal according to signal received from remote control 30 or keyboard 31 as control inputs. The control signal comprises channel switch commands and satellite switch control signals. Power transforming module 103 is coupled to CPU 102, and is configured to obtain system voltage. System voltage is converted to voltage required by satellite antenna receiving device 20 when the satellite antenna receiving device 20 is a multi-polarization type which requires different voltages. Therefore, power transforming module 103 can output different voltages to suit different conditions. For example, power transforming module 103 can convert the system voltage to 13V or 18V. Satellite switching judging module 104 is coupled to CPU 102, and is configured to receive the channel switch commands. In an embodiment, satellite switching judging module 104 analyzes if target channel is on the same satellite as current channel by checking relevant websites. In other embodiments, current broadcasting channel and other information can be stored in memory device in STB 10, such as flash memory. Therefore, satellite switching judging module 104 can analyze and make determination by reading the memory device. If the target channel and the current channel are on the same satellite, then satellite switching judging module 104 sends result of determination to CPU 102. CPU 102 sends a channel switching command to satellite antenna receiving device 20 to switch channels. When the target channel and the current channel are on different satellites, satellite switching judging module 104 sends module driving command to driving controlling module 105. Driving controlling module 105 is coupled to satellite switching judging module 104 and power transforming module 103. The driving controlling module 105 receives a command from satellite switching judging module 104, and sends short circuit detecting command to current detecting module 106, to detect if the signal line 120 between STB 10 and satellite antenna receiving device 20 is shorted or not. The result of detection is sent to CPU 102. Driving controlling module 105 also encodes a switch control command according to commands from satellite switching judging module 104 and sends the encoded switch control command to satellite antenna receiving device 20 via signal line 120.

Current detecting module 106 is coupled to driving controlling module 105 and power transforming module 103. The current detecting module 106 is configured to receive command from driving controlling module 105 and detect if signal line 120 is shorted or not. Information as to the detection is sent to driving controlling module 105. In one embodiment, current detecting module 106 scans voltage of the signal line 120, the driving controlling module 105 analyzes if it is shorted according to voltage status from current detecting module 106 detected at an output end. For example, when the output voltage is high, driving controlling module 105 determines that signal line 120 is shorted. Conversely, when the output voltage is low, driving controlling module 105 determines that signal line 120 is not shorted. In addition, if the current detecting module 106 does not detect a voltage signal after scanning signal line 120, the current detecting module 106 generates a voltage signal to signal line 120 via the current detecting module 106 scan end. Then driving controlling module 105 analyzes if the signal line 120 is shorted or not according to the output voltage of current detecting module 106 at an output end. For example, in an embodiment, current detecting module 106 scan end generates a high voltage signal to signal line 120, then driving controlling module 105 analyzes if signal line 120 is shorted or not according to output voltage signal from current detecting module output end. It should be understood that, the aforesaid method of detecting short circuit is not to limit the scope of the disclosure, current detecting module 106 can send high voltage or low voltage to signal line 120. Also, it should be understood that, although current detecting module 106 is detecting if the signal line 120 is shorted or not, signal line 120 is electrically connected with STB 10 and satellite antenna receiving device 20. Thus any part of STB 10 and satellite antenna receiving device 20 which is shorted will be detected by current detecting module 106. In other embodiments, current detecting module 106 can be set in other location to detect if satellite finding apparatus is shorted or not.

As shown in FIG. 2, CPU 102 is coupled to power transforming module 103 output port and current detecting module 106. In one embodiment, each module of STB 10 is driven by commands of CPU 102, such as channel switching command, power switching command, satellite switching command, and so on. In other embodiments, modules can be driven by each other, for example, satellite switching judging module 104 sends switch control command to satellite antenna receiving device 20 via signal line 120 directly.

As shown in FIG. 2, in an embodiment, STB 10 further comprises wireless receiving unit 101 to receive external signal from external control. The wireless receiving unit 101 which is coupled to CPU 102 is configured to send received signal to CPU 102. In other embodiment, wireless receiving unit 101 can be removed, and STB 10 obtains external signal via other ways. For example, STB 10 can receive external signal by keyboard 31, through WIFI, ZIGBEE, or other ways.

Figure 3:
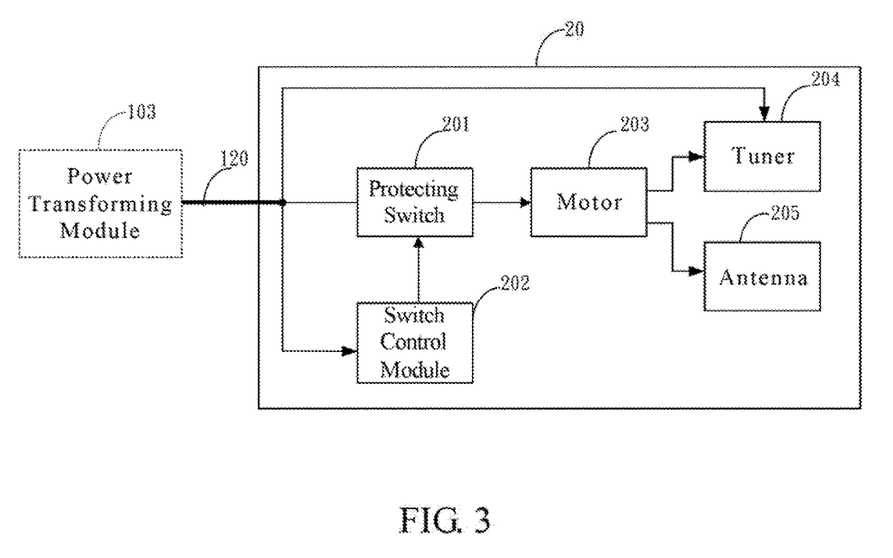
FIG. 3 is a configuration schematic diagram of a satellite antenna receiving device according to an embodiment of the disclosure.

FIG. 3 is a configuration schematic diagram of a satellite antenna receiving device 20 according to an embodiment of the disclosure.

In one embodiment, satellite antenna receiving device 20 comprises protecting switch 201 and switch control module 202. Switch control module 202 is coupled to protecting switch 201. Also switch control module 202 and protecting switch 201 are coupled to power transforming module 103. Switch control module 202 receives switch control command from driving controlling module 105 and decodes the switch control command to control protecting switch 201. Motor 203 is coupled to protecting switch 201, and is configured to receive signal from protecting switch 201 and execute corresponding action. Tuner 204 and antenna 205 are coupled to motor 203. As shown in FIG. 3, protecting switch 201 input port is coupled to tuner 204, so the tuner 204 is coupled to power transforming module 103. In one embodiment, protecting switch 201 can be switch circuit consisting of transistor and metal oxide semiconductor field effect transistors (MOSFETs).

Figure 4:
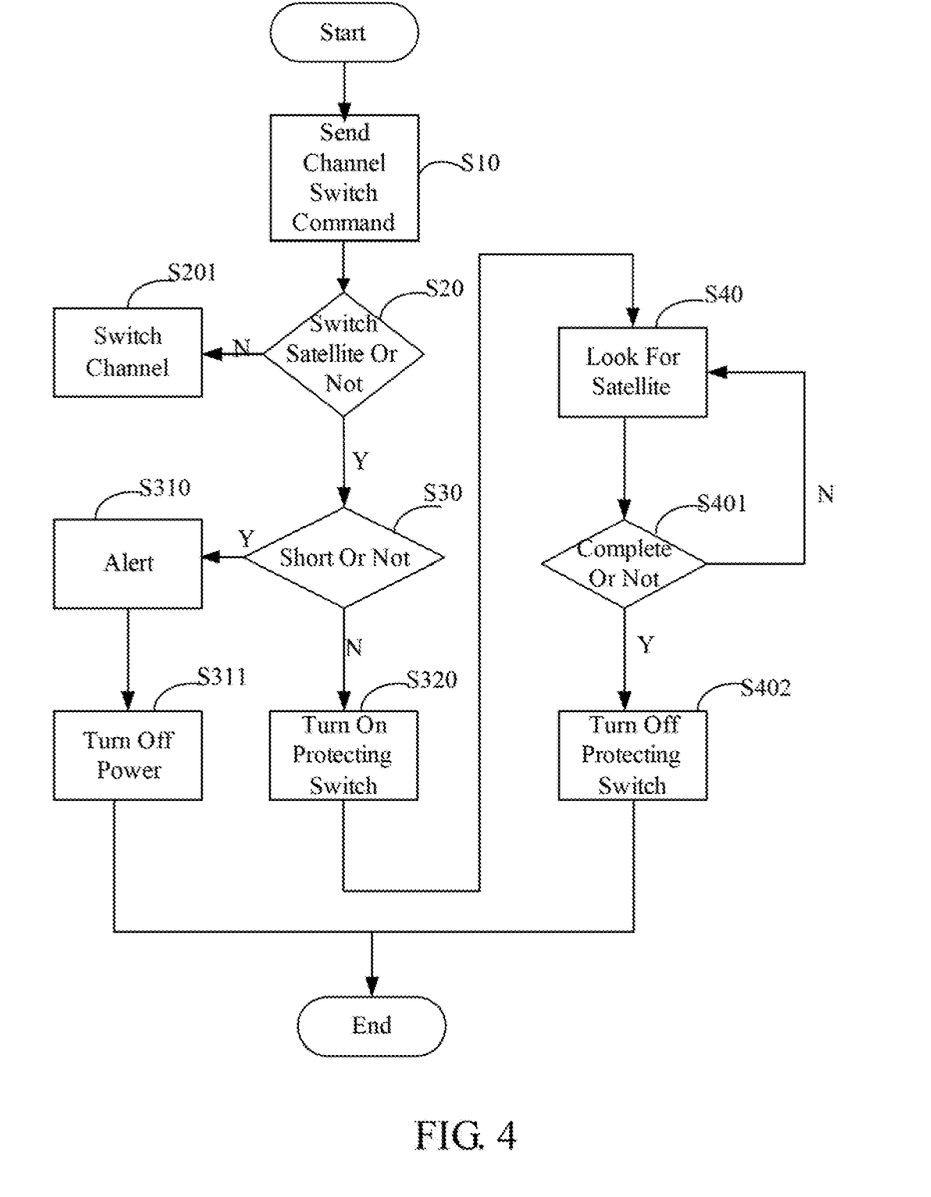
FIG. 4 is a process diagram of a satellite finding method according to an embodiment of the disclosure.

FIG. 4 is a process diagram of a satellite finding method according to an embodiment of the disclosure, the method comprises the following steps.

Step S10, CPU 102 decodes received external channel changing command and sends it to satellite switching judging module 104. The external channel switch command can be signal from keyboard 31, remote control 30 or other devices;

Step S20, satellite switching judging module 104 analyzes if the target channel and the current channel are on the same satellite. If they are on the same satellite, then step S201 is executed, otherwise step S30 is executed;

Step S201, satellite switching judging module 104 returns analytic result to CPU 102 and CPU 102 sends command to satellite antenna receiving device 20 to switch channels;

Step S30, satellite switching judging module 104 sends module driving command to driving controlling module 105 to do short circuit test on signal line 120. If signal line 120 is shorted, then execute step S310 and step S311, otherwise execute step S320;

Step S310 and step S311; driving controlling module 105 alerts CPU 102 that signal line 120 is shorted, and CPU 102 sends command to cut off power for satellite antenna receiving device 20;

Step S320, driving controlling module 105 encodes switch control command and sends encoded signal to switch control module 202 to enable protecting switch 201 to power on motor 203;

Step S40 and step S401 and step S402; CPU 102 sends satellite switching command, motor 203 rotates polar axis seat to look for and focus on satellite. When satellite is found, CPU 102 sends command to turn off protecting switch 201 to power off motor 203.

Figure 5:
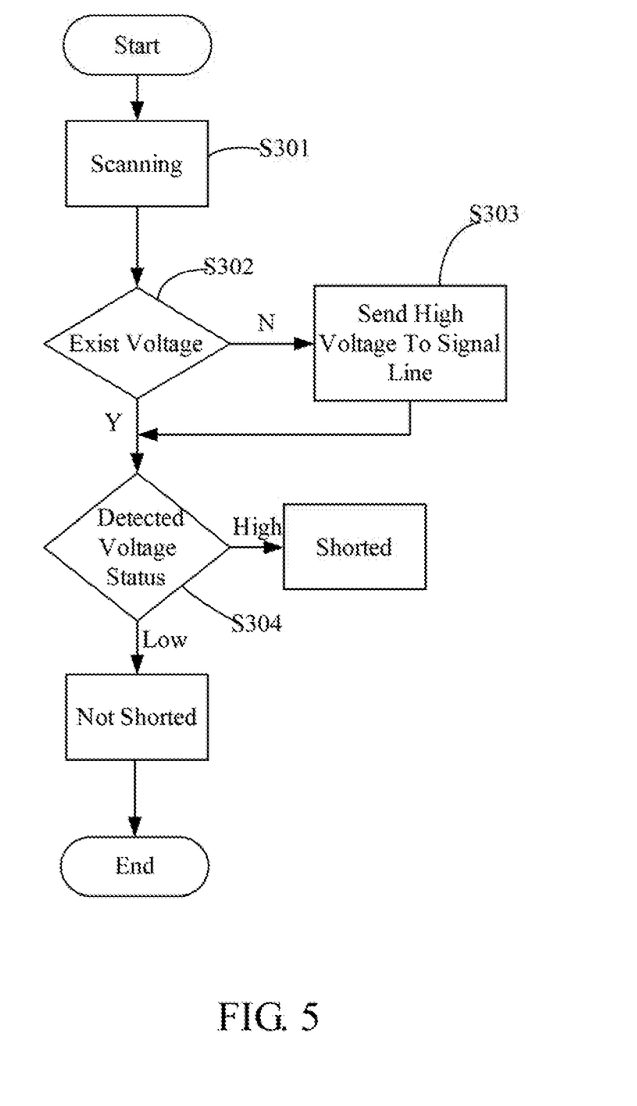
FIG. 5 is a process diagram of the short circuit detection according to an embodiment of the disclosure.

FIG. 5 is a process diagram of short circuit detection according to an embodiment of the disclosure. In an embodiment, this method comprises the following steps.

Step 301 and step 302; driving controlling module 105 sends short circuit detecting command to current detecting module 106 according to command from satellite switching judging module 104. Current detecting module 106 detects if voltage exists on signal line 120. If signal line 120 has voltage then execute step S304, otherwise execute step S303;

Step S303, current detecting module 106 sends a high voltage to signal line 120;

Step S304, analyzes output voltage from current detecting module 106 output end. If the output voltage is high, the signal line 120 is regarded as shorted. If the output voltage is low, the signal line 120 is regarded as not shorted, then sends analytic result to driving controlling module 105 and CPU 102.

Figure 6:
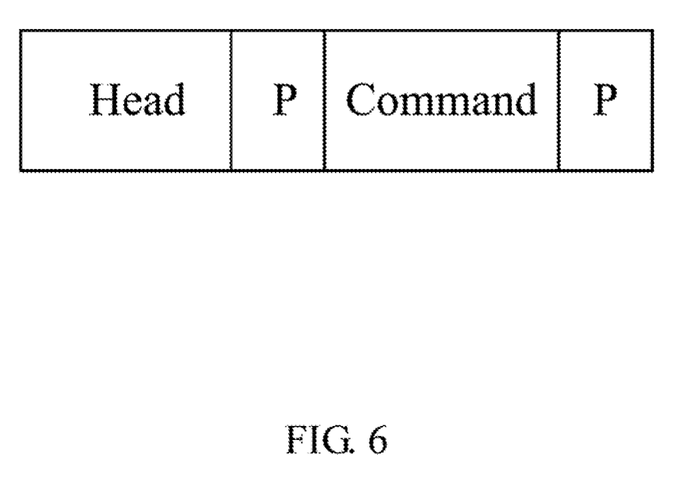
FIG. 6 is a diagram of coding scheme of switch controlling command according to an embodiment of the disclosure.

FIG. 6 is a diagram of coding scheme of switch controlling command according to an embodiment of the disclosure. The STB 10 and satellite antenna receiving device 20 can communicate via DiSEqC communication protocol. This protocol is used by many satellite programming providers for accomplishing 2-way communication through a coaxial cable. The disclosure is not limited to use of the DiSEqC protocol. Other communication methods and protocols between STBs and satellite antenna components can be used without departing from the scope hereof. In one embodiment, switch control command is based on DiSEqC commands, so it is convenient for switch control module 202 to decode switch control signal. In an embodiment the switch control command is encoding as follows:

Header: frame header, indicate that following date is switch control command;
command: define on/off commands;
P: parity check bit.

The satellite finding apparatus and satellite finding method only enable the motor when it is necessary to change satellites, when there is no need to change satellites the motor is closed to save energy. Because the motor is disabled most time, so it reduces the risk of being struck by lightning and short circuit by rain soaked, and it will detect if the satellite finding apparatus is shorted before motor enabled to protect apparatus.

The foregoing description, for purposes of explanation, is with reference to specific embodiments. However, the illustrated embodiments are not intended to be exhaustive or to limit the disclosure to the precise forms disclosed. Many modifications and variations are possible in view of the above teachings. The various modifications which are possible within the principles of the disclosure will therefore be protected within the scope of the claims.

What is claimed is:

1. A satellite finding method, comprising:
receiving, by a processing unit, a channel switching command and sending the channel switching command to a satellite switching judging module;
analyzing, by the satellite switching judging module, if an aim channel and a current channel are on same satellite, and sending a channel switching command to the CPU to switch a channel when the aim channel and the current channel are on the same satellite;
sending, by the satellite switching judging module, a module driving command to a driving controlling module to detect if a signal line is shorted when the aim channel and the current channel are on different satellites;
sending, by current detecting module, a voltage signal to the signal line, and the current detecting module detecting a signal line voltage status to detect if the signal line is shorted;
alerting, by the driving controlling module, the processing unit and turning off power of the satellite antenna receiving device when the signal line is detected shorted; and
coding, by the driving controlling module, a switch control command and sending the switch control command to a switch control module to enable a motor, and the processing unit sending a satellite switching command to the satellite antenna receiving device to look for satellite when the signal line is detected not shorted; and the process unit sending the switch control command to turn off the protecting switch and the motor.

2. The satellite finding method of claim 1, further comprising detecting if the signal line is shorted by a current detecting module according to a short circuit detecting command from the driving controlling module and sending a detected information to the driving controlling module.

3. The satellite finding method of claim 2, further comprising analyzing by the current detecting module if the signal line is shorted by detecting signal line voltage status.

4. The satellite finding method of claim 3, further comprising sending a voltage signal to the signal line and detecting again by the current detecting module when the current detecting module finds there is no voltage on the signal line.

* * * * *